United States Patent [19]

Matsui et al.

[11] Patent Number: 4,514,611
[45] Date of Patent: Apr. 30, 1985

[54] METHOD OF CONTROLLING ELECTRIC DISCHARGE MACHINE

[75] Inventors: Mitsuo Matsui, Tokyo; Teruyuki Matsumura, Hachioji, both of Japan

[73] Assignee: Fanuc Ltd., Minamitsuru, Japan

[21] Appl. No.: 398,904

[22] Filed: Jul. 16, 1982

[30] Foreign Application Priority Data

Jul. 21, 1981 [JP] Japan .................. 56-114057

[51] Int. Cl.$^3$ .............................. B23P 1/08
[52] U.S. Cl. .................. 219/69 M; 219/69 G; 219/69 S
[58] Field of Search ............... 219/69 M, 69 G, 69 S, 219/69 R, 68

[56] References Cited

U.S. PATENT DOCUMENTS

| | | | |
|---|---|---|---|
| 4,049,942 | 9/1977 | Balleys et al. | 219/69 M |
| 4,249,059 | 2/1981 | Bell, Jr. et al. | 219/69 G |
| 4,263,494 | 4/1981 | Martin | 219/69 G |
| 4,335,436 | 6/1982 | Inove | 219/69 M |

FOREIGN PATENT DOCUMENTS 2443712  4/1980  France .

Primary Examiner—M. H. Paschall
Attorney, Agent, or Firm—Staas & Halsey

[57] ABSTRACT

Disclosed is a method of controlling backward movement in an electric discharge machine wherein a workpiece is subjected to electric discharge machining by moving an electrode and the workpiece across which a voltage is applied, relative to one another. The method comprises a step of detecting a state of the electric discharge machining in response to a retraction command, a step of selecting a class corresponding to the electric discharge machining state from among a plurality of stored classes of retraction control information items indicating retraction control conditions different from one another, and a step of relatively moving and controlling the electrode and the workpiece in the backward direction in accordance with the selected class of retraction control information items.

5 Claims, 7 Drawing Figures

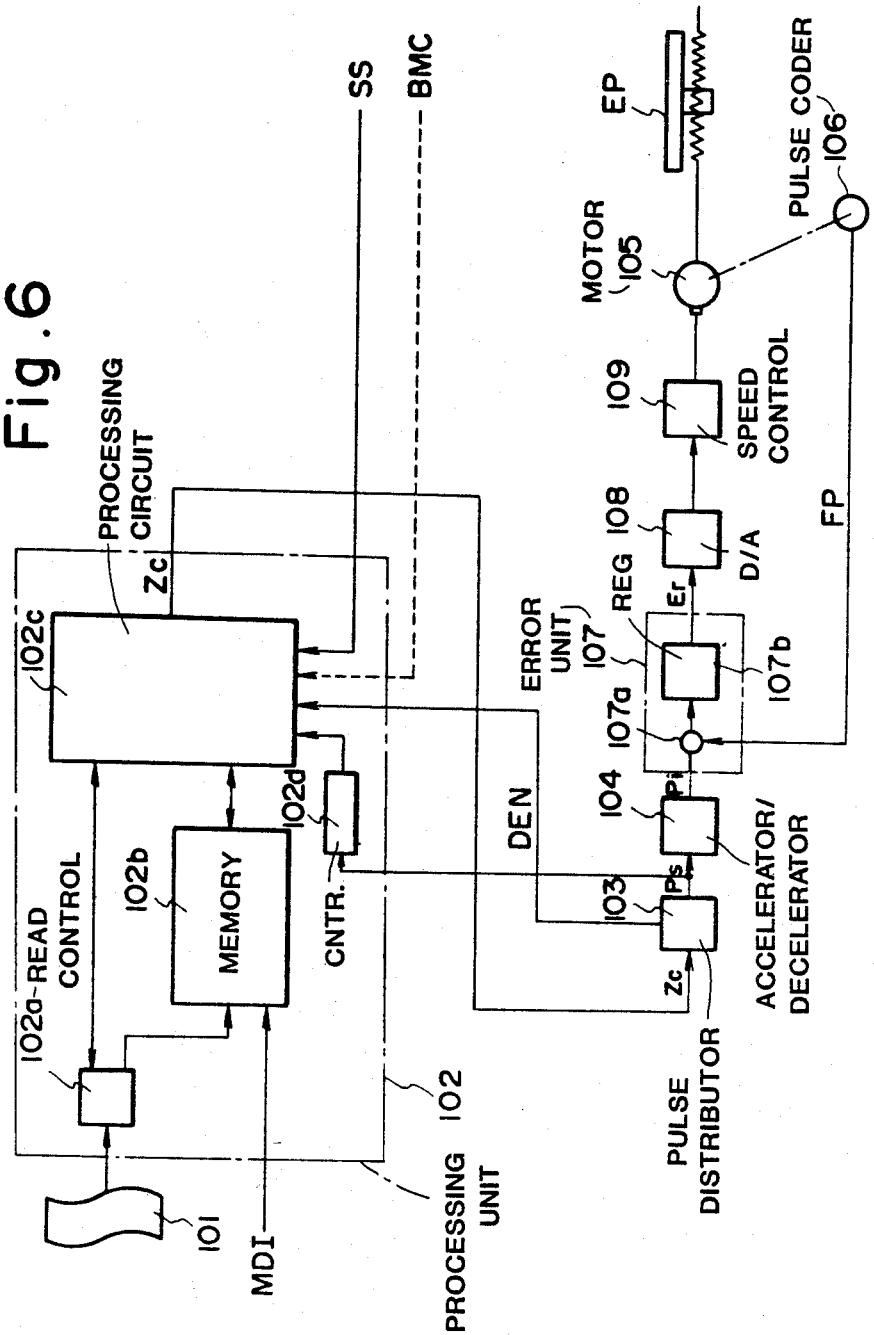

METHOD OF CONTROLLING ELECTRIC DISCHARGE MACHINE

BACKGROUND OF THE INVENTION

The present invention relates to a method of controlling an electric discharge machine in which an electrode and a workpiece are moved relative to each other to perform electric discharge machining in the workpiece, more particularly, it relates to a method of controlling an electric discharge machine well-suited for application to retraction control of the electrode.

Electric discharge machines include: (1) a wire-cut electric discharge machine wherein a wire electrode is moved relative to a workpiece along a commanded path, thereby to perform electric discharge machining; and (2) an electric discharge machine wherein an electrode of a predetermined shape, located near a workpiece, is moved in a cutting direction and an electric discharge is caused between the electrode and the workpiece, thereby to machine the workpiece to the same shape as the electrode.

FIG. 1 is a schematic explanatory view of the latter electric discharge machine. An electrode EP serving as a punch is supported by a spindle SP, and is fed, for machining in the direction of the arrow, by a servomotor (not shown). A voltage is applied by a power source PS connected to the electrode EP and a workpiece WK, which is to be machined into a die. Accordingly, when the electrode EP is advanced while a minute gap is maintained between the workpiece WK and the electrode EP, the workpiece WK is machined into a shape similar to that of the electrode EP. An enlarged bore of a desired size can be readily machined in the workpiece WK by controlling, e.g., the machining pulses and energy. If necessary, the machining operation is carried out while the electrode EP is being moved in eccentric fashion, whereby an enlarged bore of any desired dimensions can be machined.

In such an electric discharge machine, when the electrode has come into contact with the workpiece or when debris is to be removed, the electrode must be retracted along the machined path. To this end, all the conventional electric discharge machines have a retraction control function. The retraction control conditions such as retraction speed, retractable limit and a speed for advancing the electrode again after the retraction are set as parameters by the use of a manual data input device (MDI), a keyboard or the like when the machining state or the machining method has changed. Each time retraction control is required, the parameters are read to carry out the control. In this regard, only one class of fixed retraction control conditions are set in the conventional electric discharge machines. This leads to the disadvantage in that during machining operations based on one machining command program, only one class of retraction control conditions can be set, so the optimum retraction control cannot be performed. The reasons are that in the machining based on one machining command program, the depth of cut changes every moment (the change of the machining state), so the retraction control conditions comprising a retraction distance etc. need to be altered according to the depth of cut, and even in case of machining based on the identical machining command program, the machining method differs depending upon the material of the workpiece, etc., so the retraction control conditions require alteration.

FIGS. 2(a) and 2(b) are diagrams for explaining the fact that the retractable limit must be changed depending upon the depth of cut.

In a case where debris is to be removed, when the depth of cut is small as shown in FIG. 2(a), the debris can be removed easily even if the gap between the electrode EP and the workpiece WK is small because of a small retraction distance. In contrast, when the depth of cut is great as shown in FIG. 2(b), the debris cannot be removed unless a large gap is provided by retraction over a large distance. Moreover, setting a retractable limit for the case of the deep cut, as illustrated in FIG. 2(b), in a situation where the cut is shallow, as illustrated in FIG. 2(a), can give rise to a dangerous condition for the following reason. Electric discharge machining takes place in a working fluid, which is oil lin many cases. If, in the case of the shallow cut, the electrode retreats the same distance as in the case of the deep cut, it might rise above the surface of the working fluid. This can pose the danger of fire. For the above reasons, the retractable limit needs to be controlled according to the position or depth of cut as illustrated in FIG. 3. In FIG. 3, the vertical axis represents the speed of the electrode, while the horizontal axis represents the position of the electrode. A solid line corresponds to the case of the shallow cut where a retraction distance $L_1$ extends from a position $P_0$ to a position $P_2$. On the other hand, a dotted line corresponds to the case of the deep cut where a retraction distance $L_2$ extends from the position $P_0$ to a position $P_1$. Further, symbol $V_R$ denotes the speed for retracting the electrode, symbol $V_F$ the high speed for advancing the electrode after the retraction, and symbol $V_F'$ the low speed for advancing the electrode.

Moreover, when the retracting speed and the re-advancing speed are held constant irrespective of retractable limits, the retraction control time becomes long for a large retractable limit, resulting in a low machining efficiency. In order to shorten the machining time, therefore, the retracting and re-advancing speeds for the large retractable limit need to be made higher as illustrated in FIG. 4. In this figure, a solid line corresponds to the case of a small retractable limit where the retracting speed is $V_{R1}$ and the high advancing speed is $V_{F1}$, and a dotted line corresponds to the case of the large retractable limit where the retracting and re-advancing speeds are $V_{R2}$ and $V_{F2}$, respectively. With some machining methods or under some machining conditions, only the speeds must be made unequal with the retractable limits held equal, as indicated by a solid line and a dotted line in FIG. 5.

As described above, the prior-art method of controlling the electric discharge machine, in which one class of retraction control conditions are set, cannot execute retraction control which adopts to the changes in the state of electric discharge machining. Therefore, problems have been encountered wherein the electrode rises above the working fluid surface to pose the danger of fire, the electrode cannot be retracted a sufficient distance, and the machining efficiency declines.

SUMMARY OF THE INVENTION

An object of the present invention is to provide a method of controlling an electric discharge machine, wherein optimum retraction control can be performed in accordance with the state of electric discharge machining.

Another object of the present invention is to provide a method of controlling an electric discharge machine which can perform retraction control that is capable of reliably removing debris produced in electric discharge machining and that is free from the danger of fire.

Another object of the present invention is to provide a method of controlling an electric discharge machine capable of shortening retraction control time and of enhancing machining efficiency.

A method of controlling backward movement in an electric discharge machine wherein a workpiece is subjected to electric discharge machining by moving an electrode and the workpiece, across which a voltage is applied, relative to one another. The method comprises detecting a state of the electric discharge machining in response to a retraction command, selecting a class corresponding to the electric discharge machining state from among a plurality of stored classes of retraction control information items indicating retraction control conditions different from one another, and relatively moving and controlling the electrode and the workpiece in the backward direction in accordance with the selected class of retraction control information items.

Other features and advantages of the invention will be apparent from the following description taken in connection with the accompanying drawings.

BRIEF DESCRIPTION OF THE DRAWINGS

FIG. 6 is a block diagram of an embodiment for realizing the method of the present invention.

DESCRIPTION OF THE PREFERRED EMBODIMENT

Figure 1:
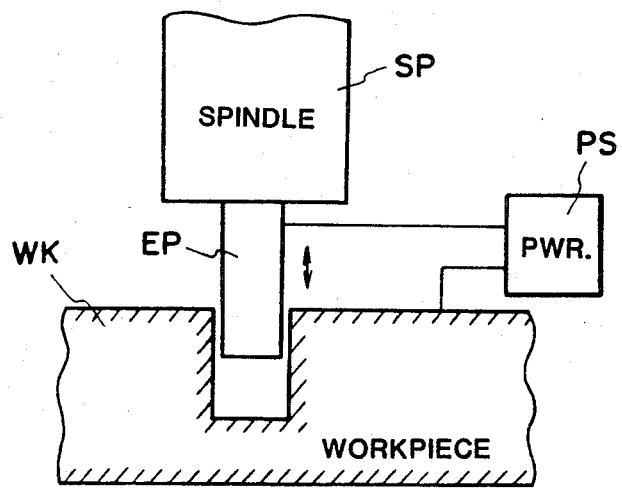
FIG. 1 is a block diagram of an electric discharge machine to which the present invention is directed.

FIG. 6 is a circuit block diagram for realizing the method of controlling an electric discharge machine according to the present invention.

Referring to FIG. 6, numeral 101 designates an NC (numerical control) tape in which NC command information for numerically controlling an electric discharge machine is punched. The NC command information includes (A) ordinary numerical information indicating the shape to be machined, (B) speed information indicating forward speeds at which machining operations are to be carried out and (C) auxiliary function instructions, etc. to be delivered to the machine side, and, in addition, (D) a plurality of classes of retraction conditions (retraction control information items) indicating how the retraction control is to be made. As stated before, retraction control depends upon the state (or conditions) of electric discharge machining, etc. Therefore, retraction speeds, retractable limits, high and low speeds for re-advancing the electrode, etc. are punched in the NC tape 101 as the retraction control information items with respect to the machining state, etc. The plurality of classes of retraction control information items may be separately entered from a manual data input device MDI. Numeral 102 designates a processing unit, which comprises a read control circuit 102a, a retraction memory 102b for storing the plurality of classes of retraction control information items from among the NC command information, a processing circuit 102c constructed of a microcomputer for executing positional control processing, retraction control processing, etc. for the electric discharge machine, and a current position counter 102d for reversibly counting distributed pulses, to be described later, in accordance with the moving direction of the electrode. The plurality of classes of retraction control information items read from the NC tape 101 or entered from the MDI are stored in the retraction memory 102b, while such items of information as the information regarding positional control of the electrode and the auxiliary function instructions are directly fed into the processing circuit 102c. The processing circuit 102c decodes the fed information, whereupon it delivers, e.g., the M, S and T function instructions to the machine side through a power sequence controller (not shown) and a move command Zc to a pulse distributor 103 in the succeeding stage. The pulse distributor 103 executes well-known pulse distribution computations on the basis of the move command Zc, and generates the distributed pulses Ps at a frequency corresponding to a commanded speed. Numeral 104 designates a known accelerator/decelerator circuit which generates a train of pulses Pi by rectilinearly accelerating the pulse rate of the train of distributed pulses Ps at the occurrence of this pulse train and rectilinearly decelerating the same at the end thereof. Numeral 105 indicates a D.C. motor by which the electrode EP is fed for machining. A pulse coder 106 generates one feedback pulse FP each time the D.C. motor 15 rotates by a predetermined amount. An error calculating and storing unit 107 is constructed of, for example, a reversible counter, and stores the difference Er between the number of the input pulses Pi received from the accelerator/decelerator circuit 104 and that of the feedback pulses FP. This error calculating and storing unit may be constructed, as shown in FIG. 6, of an arithmetic circuit 107a for calculating the difference Er between the numbers of the pulses Pi and FP, and an error register 107b for storing the error Er. More specifically, assuming that the D.C. motor 105 is rotating in the forward direction, the error calculating and storing unit 107 operates in such a manner that each time the input pulse Pi is generated, it counts up by means of the arithmetic circuit 107a, while each time the feedback pulse FP is generated, it counts down, and the difference Er between the numbers of the input pulses and the feedback pulses is stored in the error register 107b. Numeral 108 denotes a digital-to-analog converter for generating an analog voltage proportional to the content of the error register 107b, and numeral 109 a speed control circuit.

The operation of the embodiment in FIG. 6 will now be described.

Among the information read from the NC tape 101 by the read control circuit 102a, the numerical information (A), speed information (B) and auxiliary function instructions (C) are stored in a memory built in the processing circuit 102c, while the retraction control information (D) is stored in the retraction memory 102b. The processing circuit 102c takes out of its internal memory forward speed information contained in the speed information (B) and position information contained in the numerical information (A) concerning electrode machining feed, and supplies such information to the pulse distributor 103 as the move command Zc, on the basis of which the pulse distributor 103 executes the pulse distribution computations and provides the distributed pulses Ps. Upon receiving the distributed pulses Ps, the accelerator/decelerator circuit 104 accelerates and decelerates the pulse rate thereof and applies the train of command pulses Pi to the error calculating and storing unit 107. Thus, the content of the error register 107b becomes non-zero, so that the digital-to-analog converter 108 provides a voltage and the motor 105 is driven by the speed control circuit 109 so as to move the electrode EP in the forward or advancing direction. When the motor 105 has rotated by a predetermined amount, the feedback pulse FP is generated by the pulse coder 106 and is applied to the error calculating and storing unit 107. In this manner, the difference Er between the number of the command pulses Pi and that of the feedback pulses FP is stored in the error register 107b. Thenceforth, the electrode EP is servo-controlled with the difference Er maintained at a constant value in a steady state until it is advanced for machining to a desired position.

When the electrode EP has contacted the workpiece WK during the forward feed thereof for machining, a shorting signal SS is generated by a shorting detector (not shown). In response to the shorting signal SS, the processing circuit 102c immediately starts executing retraction control on the basis of the retraction control program stored in the built-in program memory.

Figure 2:
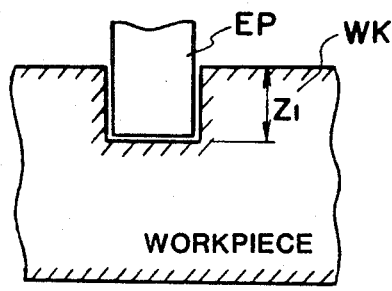
FIGS. 2(a) and 2(b) are views for explaining the operations of the electric discharge machine in FIG. 1.
Figure 2:
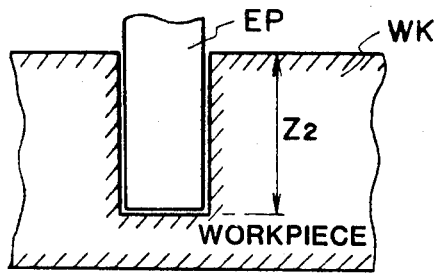
Figure 3:
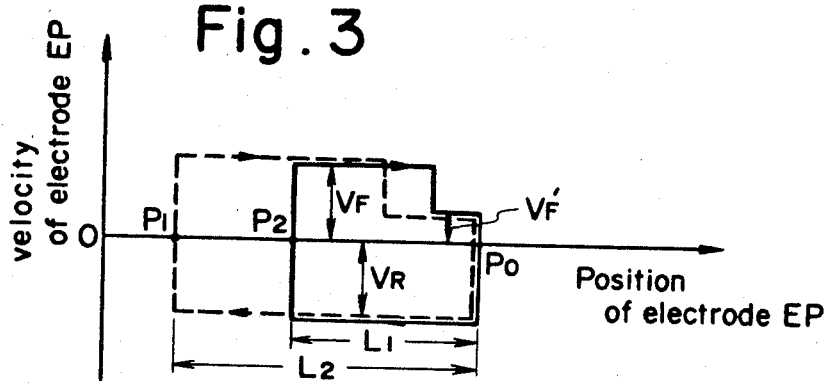
FIGS. 3 to 5 are diagrams for explaining cases where retraction conditions are altered in accordance with the present invention.
Figure 4:
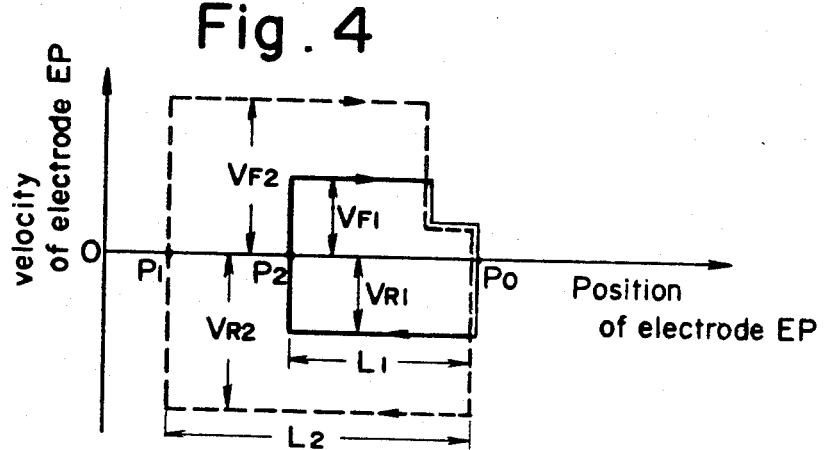
Figure 5:
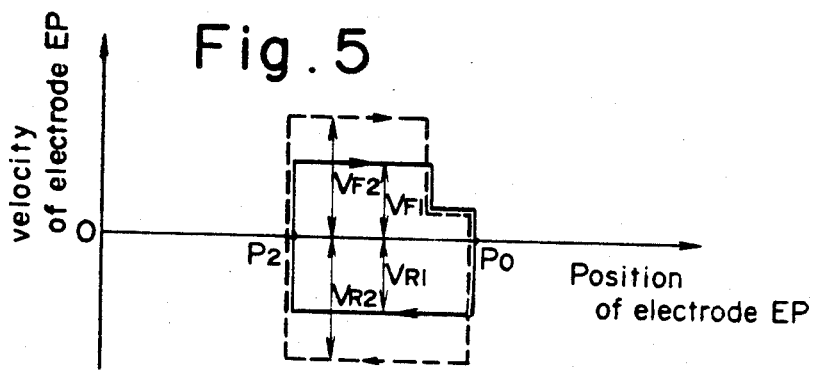

More specifically, the processing circuit 102c reads the content of the current position counter 102d which stores the position of the cut, namely, the relative position between the electrode EP and the workpiece WK. After reading the content of the current position counter 102d as the state of the electric discharge machining, the processing circuit 102c accesses the retraction memory 102b. It is assumed by way of example that the retraction memory 102b stores therein the retractable limit $L_1$, retraction speed $V_{R1}$ and re-advancing speed $V_{F1}$ in FIG. 4 as a first class of retraction control information items and also the retractable limit $L_2$, retraction speed $V_{R2}$ and re-advancing speed $V_{F2}$ as a second class of retraction control information items. When the aforementioned content of the position counter 102d is, for example, $Z_1$ as shown in FIG. 2(a), the processing circuit 102c selects the first class of retraction control information items. Conversely, when the content is $Z_2$ as shown in FIG. 2(b), the processing circuit 102c selects the second class of retraction control information items. Then, the processing circuit 102c stores the selected class of retraction control information items in its built-in memory.

A retraction or backward movement command consisting of the retractable limit and the retraction speed is prepared in the processing circuit 102c and fed into the pulse distributor 103 in order that the electrode EP may move at the aforementioned retraction speed along an already cut path and in the direction opposite to the cutting direction. As a result, the electrode EP is retracted at the predetermined retraction speed read out as described above. In a case where the shorting signal SS has vanished owing to the retraction, the processing circuit 102c stops the backward movement of the electrode EP before the retractable limit is reached. Then, it advances the electrode EP at the high speed to a set position, where forward speed is changed, and subsequently the electrode is advanced at the low speed to a predetermined position. Thus, retraction control processing ends. After such processing, the processing circuit 102c restarts electric discharge machining on the basis of a positional command and a speed command issued before the generation of the shorting signal. On the other hand, in a case where the electrode EP attempts to continue retracting beyond the retractable limit (in a case where the shorting signal SS does not vanish even when the electrode has retreated a distance set by the retractable limit), retraction is stopped, and alarm information is issued to inform the operator that the shorted state still exists.

The foregoing is the case where a predetermined class of retraction conditions are selected from among a plurality of classes of retraction conditions in accordance with the depth of cut and where the retraction control is performed on the basis of the selected retraction conditions. In this regard, means for monitoring an electric discharge machining state (or electric discharge machining condition) such as discharge current may be disposed outside the processing unit 102 so as to provide a backward movement condition instruction signal BMC for selecting retraction conditions.

As set forth above, according to the present invention, a plurality of classes of retraction conditions are set in advance, a predetermined class of retraction conditions are selected from among them on the basis of an electric discharge machining state or electric discharge machining condition, and an electrode is retracted in conformity with the selected retraction conditions. Therefore, optimum retraction control has become possible. That is, according to the present invention, debris can be reliably removed, and fire etc. can be prevented. Further, the retraction control time can be shortened to enhance the machining efficiency.

What we claim is:

1. A method of controlling an electric discharge machine having an advance control step for relatively moving and controlling in a forward direction an electrode and a workpiece to which a voltage is applied, thereby to perform electric discharge machining on the workpiece, by the use of an electric discharge caused between the electrode and the workpiece and a retraction control step of relatively moving and controlling the electrode and the workpiece in a backward direction in accordance with a retraction command, in the method of controlling the electric discharge machine, the retraction control step comprising the steps of:

determining a state of the electric discharge machining in accordance with said retraction command;

selecting a class corresponding to the electric discharge machining state from among a plurality of differing stored classes of retraction control information items indicating retracting control conditions different from one another and each differing class including a different retraction limit and a different retraction speed; and moving and controlling said electrode and said workpiece relatively in the backward direction on the basis of the selected class of retraction control information items.

2. A method of controlling an electric discharge machine as defined in claim 1, wherein said state determining step is a step of detecting relative positions of said electrode and said workpiece.

3. A method of controlling an electric discharge machine as defined in claim 1, wherein said retraction command is a short circuit signal indicating that said electrode and said workpiece have shorted.

4. A method of controlling an electric discharge machine for machining a workpiece, where depth of penetration of an electrode, normally travelling in a forward direction relative to the workpiece, is divided into ranges and different backward movement control information corresponds to each range, said method comprising the steps of:

determining, at the initiation of a control signal, the range into which the depth of penetration of the electrode falls;

selecting the corresponding backward movement control information in dependence upon the determined range, wherein said backward movement control information includes a different retraction distance and a different retracting speed for each range; and moving the electrode in a backward direction according to the selected backward movement control information.

5. A method of controlling an electric discharge machine as defined in claim 4, wherein the control signal indicates whether the electrode and the workpiece are in a short circuited condition, and wherein said method further comprises the step of moving the electrode in the forward direction when the control signal indicates that the short circuit condition no longer exists.

* * * * *

UNITED STATES PATENT AND TRADEMARK OFFICE
CERTIFICATE OF CORRECTION

PATENT NO. : 4,514,611

DATED : April 30, 1985

INVENTOR(S) : MITSUO MATSUI ET AL.

It is certified that error appears in the above-identified patent and that said Letters Patent is hereby corrected as shown below:

Col. 2, line 18, delete "lin" and insert --in--.

line 58, "adopts" should be --adapts--.

Col. 4, line 32, "15" should be --105--.

Col. 6, line 40, after "workpiece" insert --,--.

Signed and Sealed this

Fifteenth Day of October 1985

[SEAL]

Attest:

DONALD J. QUIGG

*Attesting Officer*

*Commissioner of Patents and Trademarks—Designate*